United States Patent
Benner et al.

(10) Patent No.: US 6,539,972 B1
(45) Date of Patent: Apr. 1, 2003

(54) SYSTEM OF SUPPLY, DISCHARGE AND DISTRIBUTION LINES FOR NOTABLY LIQUID OPERATING MEDIA IN ROLLING STANDS

(75) Inventors: Frank Benner, Hilchenbach (DE); Harald Rackel, Hilchenbach (DE); Friedhelm Reimann, Erndtebrück (DE); Heinz Hopfenziz, Freudenberg (DE); Helmut Stötzel, Hilchenbach (DE); Heinz Trudewind, Lennestadt (DE); Walter Nietsch, Hilchenbach (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/744,483
(22) PCT Filed: Jul. 17, 1999
(86) PCT No.: PCT/EP99/05114
§ 371 (c)(1), (2), (4) Date: Apr. 2, 2001
(87) PCT Pub. No.: WO00/05005
PCT Pub. Date: Feb. 3, 2000

(30) Foreign Application Priority Data

Jul. 24, 1999 (DE) .......................................... 198 33 323

(51) Int. Cl.[7] ................................................. F16L 5/00
(52) U.S. Cl. ....................... 137/356; 137/343; 137/357; 137/884; 137/376

(58) Field of Search ................................. 137/343, 356, 137/357, 376, 884

(56) References Cited

U.S. PATENT DOCUMENTS

| 3,589,387 A | * | 6/1971 | Raymond | 137/261 |
| 4,458,841 A | * | 7/1984 | Laakaniemi et al. | 236/49.4 |
| 4,989,632 A | * | 2/1991 | Bauerle | 137/343 |

FOREIGN PATENT DOCUMENTS

DE 9408440 9/1994

OTHER PUBLICATIONS

Patent Abstracts of Japan, vol. 004, No. 002 (C–069), Jan. 9, 1980 & JP 54 137464 A (Hitachi Ltd), Oct. 25, 1979.

* cited by examiner

Primary Examiner—A. Michael Chambers
(74) Attorney, Agent, or Firm—Friedrich Kueffner

(57) ABSTRACT

An arrangement of pipelines of a high-pressure distribution network for liquid operating media, such as lubricants, coolants, and hydraulic pressure media for control members or drives, for a roll stand having a roll housing. The pipelines are supply pipelines, discharge pipelines, and distribution pipelines, wherein the roll stand has several consumers connected to the high-pressure distribution network for the liquid operating media. The supply lines and the discharge lines are combined to form modules of groups of pipelines mountable on the roll stand. The nominal pressure of the operating media is standardized within the pipelines of the high-pressure distribution network to a value of approximately 290 bar.

9 Claims, 1 Drawing Sheet

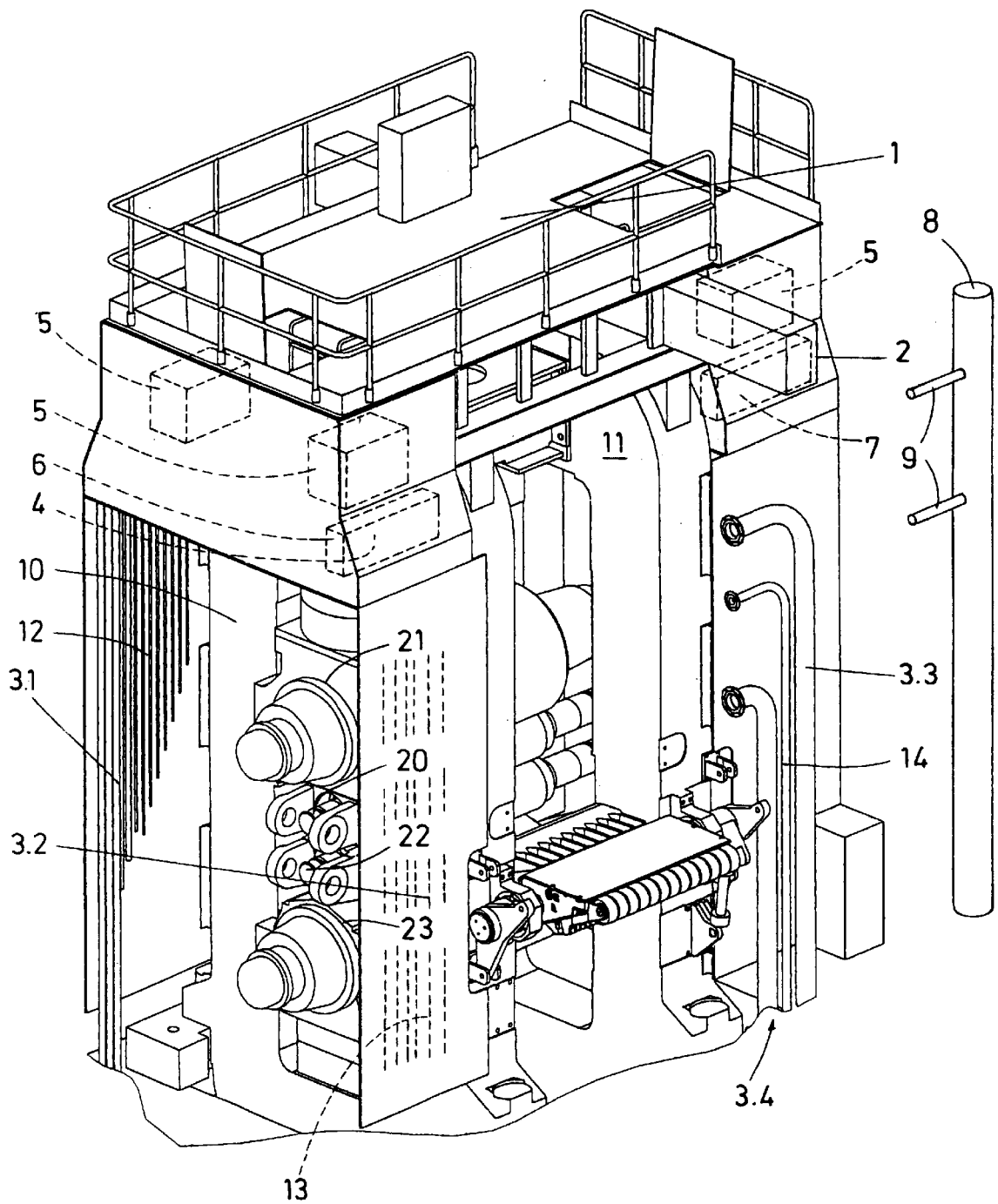

SYSTEM OF SUPPLY, DISCHARGE AND DISTRIBUTION LINES FOR NOTABLY LIQUID OPERATING MEDIA IN ROLLING STANDS

The invention relates to a system of supply, discharge and distribution lines of a distribution network for, in particular, liquid operating media, such as lubricants or coolants as well as hydraulic pressure media for control members or drives, of rolling stands provided with roll housings.

In the prior art of the rolling stand pipework, the supply of the hydraulic consumers conventionally was realized via two media stations. For this purpose, valve stands were arranged

- on the foundation (looper),
- on the stage, in particular, for servo hydraulics,
- in the basement, in particular, for auxiliary hydraulics,
- on the rolling stands, preferably at several, decentralized locations.

As a result of this, a large number of pipelines from the basement to the machine was required for which approximately 250 interfaces foundation/machine were needed; moreover, rigid pipeworks were required, partially on the roll housing, partially on pipe pieces, which resulted occasionally in leakage of the pipe pieces or their connecting elements as a result of vibrations during operation as well as other difficult conditions; an always new arrangement of the pipeline resulted because of the device-specific line guiding to individual operating locations.

DE G 94 08 440.8 discloses an embodiment of supply, discharge and distribution lines for, in particular, liquid operating media in machine housings formed of a closed or open support frame. The lines are in the form of longitudinal bores machined into the support frame of the machine housing.

Based on the aforementioned prior art, it is an object of the invention to improve or newly organize a system of supply, discharge and distribution lines of a distribution network for liquid operating media of the kind mentioned in the preamble of claim 1 in order to overall reduce thereby, inter alia, the expenditure of the construction site pipework significantly, to improve the accessibility to the pipelines, to facilitate, by arranging the controls at a central location, the serviceability and control during operation, and, inter alia, to eliminate the need for hydraulic pipework in the basement.

As a solution to this object, the invention proposes in a system of the pipelines of a distribution network for, in particular, liquid operating media on rolling stands of the kind mentioned in the preamble of claim 1 that all consumers of a rolling stand are connected to a high-pressure distribution network for the operating media and that supply and/or discharge lines of the distribution network are combined under formation of pipeline groups to modules that can be mounted on the rolling stand.

With great advantage, by means of the system according to the invention of the hydraulic supply network of a rolling stand, the expenditure of the construction site pipework is reduced overall, the accessibility to the pipelines is significantly increased, and, as a result of the arrangement of the controls at a central location, the serviceability and control possibility during operation are facilitated, and the possibility is realized to completely eliminate hydraulic pipework in the basement.

One embodiment of the invention provides that the distribution network comprises pipeline groups of the following modules:

- a central control station (5) positioned in or on the media stage of the rolling stand and connected with the pipeline groups,
- a pipe array on the top side of the rolling stand, pipe arrays on the sidewalls of the rolling stand or the supports of the rolling stand for media inflow at the operating side,
- pipe arrays on the sidewalls of the rolling stand or supports of the rolling stand for media outflow at the operating side,
- lines for media inflow at the drive side,
- lines for media outflow at the drive side.

The effects on the manufacture or mounting of the pipeline supply network of a rolling stand are significant; in particular, the following advantages result:

- reduction of formed pieces and fittings;
- reduction of bent pieces at the isometries;
- avoidance of manufacture of manufacture-intensive pipe supports;
- reduction of all welding labor;
- the modules provide an advantageous possibility for pre-manufacture of pipeline sections in a work shop independent of the rolling stands;
- a standardization of the pipeline cross-sections is possible.

An advantageous embodiment of the system results from the measure that pipeline groups or line sections are formed as construction groups of individual modules that are pre-manufactured in a workshop.

This eliminates fitting labor in this area, the mounting hours are reduced by one third by the elimination of sorting labor and storage, and a further positive auxiliary effect is realized by the elimination of the hydraulic pipework in the basement. Overall, this results in a reduced expenditure of the construction site pipework and a considerable improvement of the ease of maintenance and the serviceability.

Further advantages result according to the features of the dependent claims.

Details, features, and advantages of the invention result from the following description of an embodiment illustrated schematically in the drawing. The drawing shows:

in a perspective view, partially from the front, partially from the side, a rolling stand with a pipework of a distribution network for liquid operating media according to the invention.

In the embodiment illustrated in the drawing a significant simplification of the pipeline distribution and supply network for liquid operating media, such as lubricants or coolants as well as hydraulic pressure media for control members or drives, is achieved on the rolling stand, provided with open or closed roll housings 10, 11, by the standardization of the nominal pressure to, for example, 290 bar, for all consumers of the rolling stand. The a rolling stand is a four roll rolling stand with working rolls, which are supported in roll chocks 20, 22, and with support rolls, which are supported in roll chocks 21, 23.

The supply and/or discharge lines of the distribution network are combined with formation of pipeline groups, for example, 12, 13, 14, to modules 1 to 3.4. Advantageously, a media-guiding column 8 with connectors 9 is provided adjacent to the rolling stand for supplying operating media to the distribution network of the rolling stand. The control station 5, correlated with the module 1, is provided in the stage at the head of the rolling stand.

The distribution network comprises pipeline groups of the following modules:

all consumers of a rolling stand are connected to a high-pressure distribution network for the operating media preferably having a nominal pressure of 290 bar;

supply and/or discharge lines of the distribution network are combined with formation of pipeline groups (12, 13, 14) to modules (1–3.4);

a media guiding column (8) with connectors (9) is provided adjacent to the rolling stand for supplying operating media to the distribution network of the rolling stand; and a central control station (5) is provided for controlling and monitoring the functions of the rolling stand.

Considerable advantages are provided as a result of the fact that the pipeline groups or pipeline sections 12–14 are formed as component groups of individual modules 1–3.4 premanufactured at a workshop.

This results overall in significant advantages for the manufacture and mounting of a rolling stand, for example, by avoiding adjustment labor between modules and connecting locations, for example, of the mounting plates 6 and 7. Further advantages have been mentioned above in the description.

As is illustrated also in the FIGURE, the combination of pipeline bundles of the individual modules has advantages in that the distribution network, as a result of laying straight pipeline sections 12 to 14 as much as possible, a comparatively minimal number of formed or bent pieces is required. Instead of a plurality of individual lines for supplying and discharging operating media to individual functional elements of the rolling stand, they now extend from central distributors 6, 7 arranged on the rolling stand which themselves are connected to collecting mains or modules 3.2, 3.3, 3.4 for the operating media to be supplied and discharged.

Moreover, the FIGURE shows the advantageous arrangement of distributors 6, 7 in the form of mounting plates 4 which are preferably positioned at the inflow and outflow sides in the upper housing for connection to the pipeline groups, for example, line section 12, 13 for modules 3.2, 3.3, 3.4. The controls are arranged in four columns in the upper housing.

The lines are guided independent of mechanical components such as work roll lock, support roll lock or spindle holder.

The support points for the module 1 to be arranged on the roll housings 10, 11 are designed such that an adaptation of the module 1 is required only with respect to the width of the mill train. Accordingly, the mounting, maintenance or inspection labor or control can be performed during operation external to the mill train area at the control stations under easier working conditions.

For connecting the modules 1–3.4 to one another, flexible hoses are used. By means of the flexible connection between the modules, a mounting thereof is possible without exact length requirements and, moreover, the transmission of operation-caused vibrations or shaking is completely avoided and fitting labor in this area is not required.

Overall, the consequent application and use of the invention provides a significant reduction of the expenditure of the construction site pipework as well as an improvement of the serviceability and humanization of the working conditions when performing mounting and control work.

List of reference numerals
module
module
3.1–3.4 module
mounting plate
central control station
distributor
distributor
column
connectors
roll housing
roll housing
line section
line section
line section
roll chock
roll chock
roll chock
roll chock

What is claimed is:

1. An arrangement of pipelines of a high-pressure distribution network for liquid operating media, selected from the group consisting of lubricants, coolants, and hydraulic pressure media for control members or drives, for a rolling stand having a roll housing, wherein the pipelines are supply pipelines, discharge pipelines, and distribution pipelines, wherein the rolling stand has several consumers connected to the high-pressure distribution network for the liquid operating media, and wherein the supply lines and the discharge lines are combined to form modules (1–3.4) comprised of groups of pipelines (12, 13, 14) mountable on the rolling stand, wherein the nominal pressure of the operating media is standardized within the pipelines of the high-pressure distribution network to a value of approximately 290 bar.

2. The arrangement according to claim 1, further comprising a media-guiding column (8) having connectors (9) and positioned adjacent to the rolling stand for supplying operating media to the high-pressure distribution network.

3. The arrangement according to claim 1, further comprising flexible hoses configured to connect the modules (1–3.4) to one another.

4. The arrangement according to claim 1, wherein:

a first one of the modules (module 1) comprises a central control station positioned in or on a media stage of the rolling stand and connected with the pipeline groups;

a second one of the modules (module 3.1) comprises an array of the pipelines on the top side of the rolling stand and on supports of the rolling stand for supplying the operating media at an operating side of the rolling stand;

a third one of the modules (module 3.2) comprises arrays of the pipelines on sidewalls of the rolling stand and on the supports of the rolling stand for discharging the operating media at the operating side;

a fourth one of the modules (module 3.4) comprises the pipelines for supplying the operating media at a drive side of the rolling stand; and a fifth one of the modules (module 3.3) comprises the pipelines for discharging the operating media at the drive side.

5. The arrangement according to claim 1, wherein the pipeline groups or pipeline sections (12–14) are modular units of the modules (1–3.4) premanufactured in a workshop.

6. The arrangement according to claim 6, further comprising distributors (6, 7) arranged centrally on the rolling stand and connected to collecting mains or the modules (3.2, 3.3, 3.4) for the operating media to be supplied and discharged, wherein the pipelines are connected to the distributors (6, 7).

7. The arrangement according to claim 6, wherein the distributors (6, 7) are formed as mounting plates (4) and are positioned in an upper rolling stand housing for connecting the pipeline groups of the modules (3.2, 3.3, 3.4).

8. The arrangement according to claim 1, wherein the high-pressure distribution network as a result of laying straight line sections (12–14) as much as possible has a comparatively small number of formed or bent pieces.

9. The arrangement according to claim 1, comprising a central control station (5) for the modules configured to control and monitor the functions of the rolling stand.

* * * * *